UNITED STATES PATENT OFFICE.

HENRY A. KOHMAN, OF PITTSBURGH, PENNSYLVANIA, CHARLES HOFFMAN, OF NEW YORK, N. Y., AND TRUMAN M. GODFREY, OF PITTSBURGH, PENNSYLVANIA.

YEAST-SAVING COMPOSITION IN BREAD-MAKING.

1,151,526.            Specification of Letters Patent.            Patented Aug. 24, 1915.

No Drawing.        Application filed July 14, 1915. Serial No. 39,773.

*To all whom it may concern:*

Be it known that we, HENRY A. KOHMAN, residing in the city of Pittsburgh, Allegheny county, State of Pennsylvania, CHARLES HOFFMAN, residing in New York city, county and State of New York, and TRUMAN M. GODFREY, residing in the city of Pittsburgh, Allegheny county, State of Pennsylvania, have invented certain new and useful Improvements in Yeast-Saving Compositions in Bread-Making; and we do hereby declare the following to be a full, clear, and exact description of the invention, such as will enable others skilled in the art to which it appertains to make and use the same.

The present invention relates to the manufacture of leavened bread, and more particularly to a composition of matter useful as a yeast food or stimulant and in the maturing of the dough in said manufacture, and which particularly serves to effect a radical saving in amount of yeast required for the leavening and ripening of a given dough batch within the normal period of time required for such leavening, and which also permits an important saving in the amount of sugar usually employed.

The composition of matter constituting the subject-matter of the invention comprises ammonium chlorid, calcium sulfate, and potassium bromate, incorporated in a suitable quantity of flour used as a filler.

The ingredients referred to are compounded approximately in the following proportions, to wit: .64 ounces ammonium chlorid; 1.76 ounces of calcium sulfate; .0176 ounces potassium bromate; 2.8 ounces flour.

In using the composition, the total just specified is to be intimately and homogeneously admixed with 100 pounds of flour, entering into the dough batch, together with the other ingredients employed in the manufacture of leavened bread. A portion (1.5 ounces) of the total amount of common salt (sodium chlorid) of the dough batch may usefully be incorporated in our composition of matter, as one of the ingredients thereof.

We do not claim herein the employment of ammonium chlorid and calcium sulfate, either alone, or together, in the manufacture of leavened bread, inasmuch as the use of these materials is not of our joint invention. We have discovered, however, that when potassium bromate is associated with these two salts, it is feasible to employ a lesser amount of calcium sulfate, and nevertheless to obtain the saving in yeast and sugar contemplated. So also, we have ascertained that the presence of the calcium sulfate and ammonium chlorid permit the employment of a lesser amount of potassium bromate than would be necessary for effecting these economies, if the bromate alone were used.

What we claim is:

A new composition of matter, for use, associated with yeast, in the making of leavened bread, flour containing in admixture therewith ammonium chlorid, calcium sulfate, and potassium bromate; substantially as described.

HENRY A. KOHMAN.
CHARLES HOFFMAN.
TRUMAN M. GODFREY.